(12) United States Patent
Pease et al.

(10) Patent No.: US 9,410,459 B2
(45) Date of Patent: Aug. 9, 2016

(54) ENGINE SYSTEM

(75) Inventors: Nicholas Pease, Derbyshire (GB); Joanne Melville, Derbyshire (GB)

(73) Assignee: J.C. BAMFORD EXCAVATORS LIMITED, Uttoxeter, Staffordshire (GB)

( * ) Notice: Subject to any disclaimer, the term of this patent is extended or adjusted under 35 U.S.C. 154(b) by 0 days.

(21) Appl. No.: 14/239,767

(22) PCT Filed: Aug. 24, 2012

(86) PCT No.: PCT/GB2012/052084
§ 371 (c)(1),
(2), (4) Date: May 19, 2014

(87) PCT Pub. No.: WO2013/030548
PCT Pub. Date: Mar. 7, 2013

(65) Prior Publication Data
US 2014/0298773 A1 Oct. 9, 2014

(30) Foreign Application Priority Data
Aug. 26, 2011 (GB) .................................. 1114819.4

(51) Int. Cl.
*F01N 3/00* (2006.01)
*F01N 3/20* (2006.01)
*F01N 3/035* (2006.01)

(52) U.S. Cl.
CPC .............. *F01N 3/2066* (2013.01); *F01N 3/035* (2013.01); *F01N 2570/18* (2013.01); *F01N 2590/08* (2013.01); *F01N 2610/02* (2013.01); *Y02T 10/24* (2013.01)

(58) Field of Classification Search
CPC ... F01N 3/035; F01N 3/2066; F01N 2590/08; F01N 2610/02; F01N 2570/18

USPC ..................................................... 60/274, 301
See application file for complete search history.

(56) References Cited

U.S. PATENT DOCUMENTS

2004/0159096 A1* 8/2004 Yasui et al. ..................... 60/286
2006/0039843 A1 2/2006 Patchett et al.
(Continued)

FOREIGN PATENT DOCUMENTS

| WO | WO-2007/104382 A1 | 9/2007 |
|---|---|---|
| WO | WO-2008/070551 A2 | 6/2008 |
| WO | WO-2011/087819 A2 | 7/2011 |

OTHER PUBLICATIONS

Search Report for GB 1114819.4, dated Nov. 11, 2011.
(Continued)

*Primary Examiner* — Jason Shanske
(74) *Attorney, Agent, or Firm* — Marshall, Gerstein & Borun LLP

(57) ABSTRACT

A diesel engine having improved particulate emissions for particle material (PM) reduction for off-highway engine systems includes
 a reductant introduction point downstream of the diesel engine and in fluid flow communication therewith with no intervening treatment systems;
 a conduit immediately downstream of the reductant introduction point having sufficient length to enable mixing of the reductant with exhaust gases of the engine,
 an SCR immediately downstream of the conduit, the with good low temperature activity such that a diesel oxidation catalyst (DOC) is not needed
 an ammonia slip catalyst (ASC) downstream of the SCR acting to remove excess ammonia to meet the relevant limits for ammonia; and
 wherein the ASC and the SCR in combination act to remove excess PM.

16 Claims, 5 Drawing Sheets

(56) References Cited

U.S. PATENT DOCUMENTS

| | | |
|---|---|---|
| 2008/0141661 A1 | 6/2008 | Voss et al. |
| 2008/0256936 A1 | 10/2008 | Zuberi |
| 2010/0236224 A1 | 9/2010 | Kumar et al. |
| 2010/0290963 A1* | 11/2010 | Andersen ........... B01D 53/9418 423/213.2 |
| 2010/0319316 A1* | 12/2010 | Kasahara ........................ 60/273 |
| 2011/0017395 A1 | 1/2011 | Vandiver et al. |
| 2011/0047974 A1* | 3/2011 | Henry et al. ................... 60/274 |
| 2011/0131956 A1* | 6/2011 | Yasui et al. .................... 60/277 |
| 2011/0146237 A1 | 6/2011 | Adelmann et al. |
| 2011/0146254 A1* | 6/2011 | Yi et al. ......................... 60/310 |
| 2011/0192147 A1* | 8/2011 | Hoskin .......................... 60/286 |
| 2011/0258992 A1* | 10/2011 | Gonze et al. ................... 60/297 |

OTHER PUBLICATIONS

First Examination Report for GB 1114819.4, dated Jun. 30, 2013.
Second Examination Report for GB 1114819.4, dated Dec. 16, 2013.
Search Report for PCT/GB2012/052084, dated Nov. 27, 2012.
Written Opinion for PCT/GB2012/052084, dated Nov. 27, 2012.

* cited by examiner

ENGINE SYSTEM

FIELD OF THE INVENTION

The present invention relates to an engine system. More particularly, the present invention relates to an engine system comprising an engine and after-treatment arrangement configured to meet the Tier IV final and/or Stage 4 emissions standards for off-highway ("nonroad") engines. The present invention also relates to a method of reducing diesel engine system emissions

BACKGROUND OF THE INVENTION

In order to reduce atmospheric pollution caused by the emission of potentially harmful substances from engines, legislation has been introduced in the USA and the European Union to progressively lower legally binding limits for certain emissions. Similar limits have been adopted in other territories, but often lag some years behind the USA and EU For off-highway vehicles the limits have tended to have been introduced later than the equivalent on-highway engines. However, one of the biggest challenges for off-highway is that one engine will be fitted to a much wider variety of applications. This causes difficulties in ensuring that all engines meet the emissions limits regardless of application or installation configuration.

In the EU Stage IV of the limits enters into force in 2014, with higher output engines in the range of 130 to 560 kW needing compliance by January 2014, and lower output engines in the range of 35 to 130 kW needing compliance by October. The limits, testing regime and timetable are set out in EU Directive 97/68 and relevant daughter directives.

The corresponding US Legislation is referred to as Tier 4, and its introduction is staged between 2011 and 2014, with the "Tier 4 Final" standard needing to be fully met by the end of 2014. This legislation is set out in U.S Code of Federal Regulations (CFR). Title 40: Protection of the Environment Parts 1039, 1065 and 1068 plus all relevant guidance notes. A significant difference between the interim Tier 4 limit and Tier 4 final is a reduction in the oxides of nitrogen ($NO_x$) limit.

Although the full requirements of this legislation are readily available, the key limits for $NO_x$ and PMs are 0.40 g/kWh and 0.02 g/kWh respectively for engines with power outputs in the range of 56 to 560 kW for US Tier 4 final, and 0.40 g/kWh and 0.025 g/kWh for EU Stage IV. The EU Stage IV legislation also limits ammonia emissions to a mean 25 ppm over the test cycle. Engines are to be tested in both steady state operation, and when following a US EPA and EU agreed nonroad transient cycle (NRTC). This cycle includes a cold start test which is weighted as 5% of the US test, and 10% of the EU tests.

It is usual for other countries or regions to adopt the same or similar emissions standards as the USA and EU, often with a later introduction date.

Various emissions abatement technologies are known for diesel engines, which may be used alone or in combinations to meet these limits. These technologies include the following:

Exhaust gas recirculation (EGR) systems which recirculate, under particular operating engine conditions, a portion of an engine's exhaust gas back into the engine combustion chambers (and typically cools that gas before it is introduced). This tends to lower combustion chamber temperatures. Since the production of oxides of nitrogen ($NO_x$) increases at elevated combustion temperatures, lowering the temperature is an effective way of inhibiting inhibit the production of $NO_x$. However, a potential downside of EGR is an increased production of particulate matter (PM) by the engine.

Diesel particulate filters (DPF) are provided to remove PMs from engine exhausts. As the particulate matter may accumulate in the filter causing blockages and mechanisms are required to clean the filter. Passive filters use a catalyst to remove accumulations, but need high temperatures to work. This cannot be guaranteed for off-highway applications, because the engine may spend a significant time idling, such that sufficient temperatures may not be achieved passively. An "active" DPF is therefore desirable for the technology to be effective in off-highway applications. Active DPFs periodically burn fuel, either in a fuel burner, or by using the engine management system to increase exhaust temperature by changing the fuel injection strategy to heat the filter to PM combustion temperatures. High reductions in PMs are achieveable (up to 99% in optimal conditions). Disadvantages of DPFs include an increased specific fuel consumption, and problems with the management of the extra heat expelled to other vehicle components or the surrounding environment, due to the higher exhaust temperatures. Consequently further heat mitigation measures may be needed. Additionally, the use of an a DPF upstream of other treatment units means that those other treatment units my need to use materials resistant to higher temperatures.

Diesel oxidation catalysts (DOC) utilise high surface area palladium and platinum catalysts to reduce hydrocarbons (HC) and carbon monoxide (CO) by a simple oxidation mechanism. As a result of the reduction in HC, there can also be a reduction in the mass of PMs, typically of the order of 20%.

Particulate oxidation catalysts (POC) use a contorted path to trap and remove some PM. The effectiveness of PM removal is typically between that of a DPF and DOC.

Selective catalytic reduction (SCR) combines the use of a catalyst such as vanadium, tungsten, copper zeolite (Cu-Zeolite), or iron zeolite (Fe-Zeolite) with a reductant such as anhydrous ammonia, aqueous ammonia, or more typically, urea, to convert NO and $NO_2$ to nitrogen and water. Urea is typically used as the reductant, but has to be injected into the exhaust somewhat upstream of the SCR catalyst in order to thermally decompose into ammonia by the point at which it enters the SCR catalyst. Urea is preferred over ammonia, as it substantially safer to store and transport. In the USA, commercially available urea for use with SCRs is referred to as Diesel Exhaust Fluid (DEF), whereas in Europe it is referred to as "AdBlue®". For SCRs to function effectively at the lower end of the temperature spectrum it has hitherto been desirable for there to be a 50:50 split of NO and $NO_2$, although Cu-Zeolite catalysts have been found to improve performance at temperatures of less than 300° C. when there is little $NO_2$ available. An advantage of SCR is that it has minimal impact of specific fuel consumption. Disadvantages include the need to additionally replenish the reductant on a periodic basis, and to provide space on a vehicle to package a reservoir of reductant. Typically, reductant usage is 1-7% that of diesel consumption. Further, there is a risk that excess injection of urea reductant, or that ammonia resident in the SCR catalyst at lower temperatures and released as the catalyst heats, causes unreacted ammonia to be emitted from the SCR into the atmosphere. This is referred to in the industry as "ammonia slip".

Ammonia slip catalysts (ASC)—also known as or ammonia oxidation (AMOX) Catalysts—may be provided downstream of an SCR to oxidise ammonia to nitrogen and water and therefore prevent its escape into the atmosphere.

Lean NO$_x$ traps (LNT)—also known as NO$_x$ adsorber catalysts (NAC)—act to hold NO$_x$ until it the capacity of the adsorber is reached. At this point they may be regenerated by running the engine rich for a period of time. A so-called active LNT may be located upstream of a passive SCR. Ammonia that is generated during regeneration of the LNT may then be used in the SCR as a way of improving NO$_x$ removal. However, the periodic rich running required for regeneration is easier to achieve in smaller engines of light passenger vehicles up to a capacity of around 2.0-2.5 liters The off-highway engine industry has a prevailing view that to meet both the PM and NO$_x$ limits of Tier 4 Final/Stage 4, aftertreatment will require a DOC, DPF, SCR and ASC in series, or at the very least a DOC, SCR and ASC. In particular, marketing literature from manufacturers may refer to "SCR only solutions", whereas these solutions in fact additionally comprise a DOC, and/or comprise two SCRs. These aftertreatment solutions may add significant cost to an overall engine system, and/or may reduce the engine's fuel economy.

The present invention seeks to overcome, or at least mitigate the problems of the prior art.

SUMMARY OF THE INVENTION

A first aspect of the invention provides an engine system comprising: a diesel engine having particulate emissions such that a particle material (PM) reduction of <50% is required to meet Tier 4 final and/or Stage IV or equivalent emissions standards PM limit for off-highway engine systems; a reductant introduction point downstream of the diesel engine and in fluid flow communication therewith with no intervening treatment systems; a conduit immediately downstream of the reductant introduction point having sufficient length to enable mixing of the reductant with exhaust gases of the engine, an SCR immediately downstream of the conduit, the with good low temperature activity such that a diesel oxidation catalyst (DOC) is not needed to make the required proportions of NO to NO$_2$ to meet the NO$_x$ limit of the Tier 4 final/Stage IV emissions standards for off-highway engine systems; an ammonia slip catalyst (ASC) downstream of the SCR acting to remove excess ammonia to meet the limits under Tier 4 final/Stage IV off-highway engine systems for ammonia; and wherein the ASC and the SCR in combination act to remove excess PM to meet the limits under Tier 4 final/Stage IV off-highway engine systems for PM.

By obviating the need for further aftertreatments, such as a DPF, DOC or additional SCR upstream of the SCR, significant savings in the cost of the engine system may be obtained. Furthermore, the engine may have a lower specific fuel consumption compared to equivalent engines that utilise these treatments.

The ASC preferably removes a majority of the PM that are overall removed by the SCR and ASC, and may in fact remove substantially all of the PM that are overall removed by the SCR and ASC.

The engine system preferably includes an exhaust gas recirculation (EGR) system.

The ASC may be immediately downstream of the SCR, to optimise packaging thereof.

More preferably, the ASC is housed in the same housing as the SCR to further optimise packaging thereof.

The reductant is preferably ammonia, and optionally is introduced as urea, and decomposes in the conduit to form ammonia.

The proportion of NO$_2$:NO at the entry to the SCR is preferably less than 50:50.

The SCR is preferably a copper zeolite catalyst to improve its low temperature efficiency.

The engine preferably has a capacity of greater than 2.5 liters.

The SCR catalyst advantageously has a space velocity of in excess of 5000 hr$^{-1}$, preferably 20000-80000hr$^{-1}$ at rated power—i.e. at the engine speed at which the quoted power output for the engine is achieved.

The engine system preferably has a power output in the range of 55 kW to 130 kW.

The ratio of SCR volume to engine swept volume is preferably between around 1.5 and around 3.

A second aspect of the invention provides off-highway or nonroad vehicle incorporating an engine system according to the first aspect of the present invention.

A third aspect of the present invention provides a method of reducing diesel engine system emissions comprising the steps of: providing a diesel engine having particulate emissions such that a particle material (PM) reduction of <50% is required to meet Tier 4 final and/or Stage IV emissions standards PM limit for off-highway engine systems; introducing a reductant downstream of the diesel engine and in fluid flow communication therewith with no intervening treatment systems; mixing the reductant with exhaust gases of the engine, treating the mixture of reductant and exhaust gases in an SCR immediately downstream of the conduit, the SCR having good low temperature activity such that a diesel oxidation catalyst (DOC) is not needed to make the required proportions of NO to NO$_2$ to meet the NO$_x$ limit of the Tier 4 final/Stage IV emissions standards for off-highway engine systems; treating the gases in an ammonia slip catalyst (ASC) downstream of the SCR to remove excess ammonia to meet emission limits under Tier 4 final/Stage IV off-highway engine systems for ammonia; and wherein the ASC and the SCR in combination act to remove excess PM to meet the emission limits under Tier 4 final/Stage IV off-highway engine systems for PM.

A fourth aspect of the invention provides an emissions abatement system comprising: a reductant introduction point downstream of a connection to an exhaust outlet of a diesel engine and in fluid flow communication therewith with no intervening treatment systems; a conduit immediately downstream of the reductant introduction point having sufficient length to enable mixing of the reductant with exhaust gases of the engine, an SCR immediately downstream of the conduit, the with good low temperature activity such that a diesel oxidation catalyst (DOC) is not needed to make the required proportions of NO to NO2 to meet the NOx limit of the Tier 4 final/Stage IV emissions standards for off-highway engine systems; an ammonia slip catalyst (ASC) downstream of the SCR acting to remove excess ammonia to meet the limits under Tier 4 final/Stage IV off-highway engine systems for ammonia; and wherein the ASC and the SCR in combination act to reduce PM emissions by 20% or more.

BRIEF DESCRIPTION OF THE DRAWINGS

Embodiments of the invention will now be described with reference to the accompanying drawings in which.

DETAILED DESCRIPTION OF EMBODIMENT(S)

Figure 1:
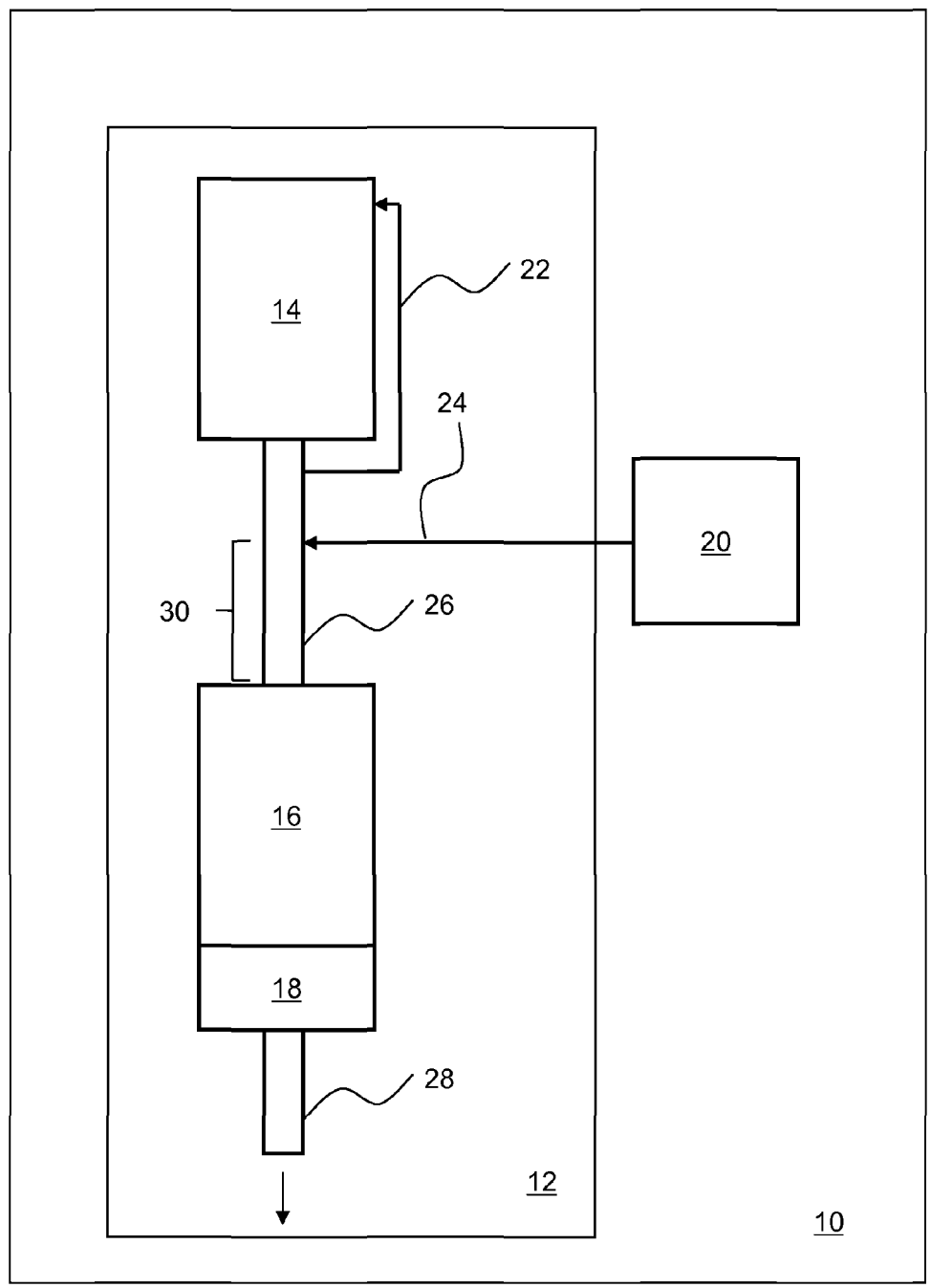
FIG. 1 is a schematic representation of an off-highway vehicle incorporating an engine system according to an embodiment of the present invention.

FIG. 1 illustrates schematically an off-highway (nonroad) vehicle 10 powered by an nonroad engine system 12 according an embodiment of the present invention. The engine may power ground engaging wheels or tracks to move the vehicle and/or may power one or more working functions of the vehicle, such as hydraulic pumps to power hydraulic rams of excavating backhoes, lifting booms, and tipping mechanisms and the like; hydraulic pumps to power auxiliary hydraulic spool valves; power take-offs; electrical generators and the like.

In accordance with US 40 C.F.R. §1068.30 engines encompassed by the term nonroad engine include any internal combustion engine:

"(i) In or on a piece of equipment that is self-propelled or serves a dual purpose by both propelling itself and performing another function (such as garden tractors, off-highway mobile cranes and bulldozers); or (ii) In or on a piece of equipment that is intended to be propelled while performing its function (such as lawn-mowers and string trimmers); or (iii) That, by itself or in or on a piece of equipment, is portable or transportable, meaning designed to be and capable of being carried or moved from one location to another. Indicia of transportability include, but are not limited to, wheels, skids, carrying handles, dolly, trailer, or platform."

Static, waterborne and aircraft engines are not included within this definition.

Off-highway vehicles are for example those used in construction industries (e.g. backhoe loaders, slew excavators telescopic handlers, forklifts, skid-steer loaders, dump trucks, bulldozers, graders), agricultural industries (tractors, combine harvesters, self propelled harvesters and sprayers), quarrying (e.g. loading shovels, aggregate crushing equipment), and forestry (timber harvesters, feller bunchers).

An engine 14 of the engine system in this embodiment is one physically designed and whose engine management system is programmed to minimise particulate emissions, but as a consequence tend to produce higher $NO_x$ emissions. Engines of this type are referred to as "clean combustion" engines.

An example of an engine of this type is the applicant's series of engines offered under the Dieselmax® brand. These engines have capacities of 4.4 and 4.8 l. The engines are four stroke, have four cylinders, and have a range of power outputs between 55 kW and 129 kW. The engines utilise common rail fuel injection, with optimised injector nozzle characteristics to enhance fuel atomisation and therefore burn, as well as variable geometry turbochargers, all of which contribute to low engine PM emissions. Indeed the applicant has found that the engine itself has PM emissions so low, that less than a 50% reduction in emissions needs to be achieved in order to meet the Tier 4 final/Stage IV particulate limits (i.e. the engine's own PM emissions without aftertreatment are 0.04 g/kWhr or less, taking EGR into account).

The engines are further fitted with cooled EGR system 22 to minimise $NO_x$ emissions prior to aftertreatment. It will be appreciated that the aforesaid engines are referred to merely as examples of the type suitable for incorporation into an engine system of the present invention. It is anticipated that the engine system of the present invention is particularly applicable to engines having a capacity in excess of around 2.5 liters.

Exhaust gases exit the engine 14 in an exhaust duct 26.

A reductant introduction point is provided in the exhaust duct 14 downstream of the diesel engine 12 and in fluid flow communication therewith. Typically the reductant used is urea of the conventional type sold commercially as DEF or AdBlue®. The reductant is stored in a reservoir 20 at a suitable location on the vehicle 10. A suitable metering system (not shown) is provided to ensure the rate of introduction matches requirements (typical usage is 1-7%) of diesel consumption. In contrast with other system that seek to meet the EU Stage IV and/or US Tier 4 final emissions standards, there are no intervening treatment systems between the engine exhaust outlet and the reductant introduction point.

Since urea needs to thermally decompose in a hydrolysis process in order to form ammonia (and carbon dioxide), a length of the exhaust duct 26 defines a mixing conduit 30 immediately downstream of the reductant introduction point. The conduit has sufficient length to enable mixing of the reductant with exhaust gases of the engine for thermal decomposition to occur. The conduit 30 may additionally comprise baffles or other features to enable mixing to occur with a shorter conduit.

In other embodiments, the length of conduit 30 may be significantly shortened, for example if ammonia gas itself is injected (e.g. if the ASDS-2 system for ammonia injection supplied by Amminex A/S of Søborg, Denmark is employed).

An SCR 16 is provided immediately downstream of the conduit 30. The SCR 16 has good low temperature activity, for example a Cu-zeolite catalyst is used. At low exhaust temperatures (<300° C.) SCRs of this type are less dependent upon the ratio of NO to $NO_2$ to be effective to meet the Tier 4 final/Stage IV emissions standards. Exhaust temperatures for the engine system of the present invention are typically in the range of 100-450° C. and catalyst volume to engine swept volume is typically in a range of 1.5-3.

Other SCR types typically require a diesel oxidation catalyst (DOC) upstream of the SCR to ensure proportions of NO to $NO_2$ at the SCR inlet are around 50:50 to ensure efficient SCR function that meets the $NO_x$ limit of the Tier 4 final/Stage IV emissions standards, adding to the overall cost of the system.

Since Cu-Zeolite catalysts are not as dependent on the inlet $NO:NO_2$ ratio at low temperature than Fe-Zeolite or Vanadium catalysts, by removal of an upstream catalyst, Cu-Zeolite SCR can enable an overall system cost reduction without the need for excessive exhaust gas heating.

An ammonia slip catalyst 18 (ASC) is provided downstream of the SCR 16. In this embodiment the ASC 18 is provided immediately downstream of the SCR in the same housing to minimise space requirements. A exhaust pipe 28 is provided downstream of the ASC 18 to duct the treated exhaust gases to a suitable location on the vehicle for emitting to atmosphere. The exhaust pipe 28 may further incorporate a silencer/muffler to reduce sound emissions.

The present applicant has recognised that an SCR catalyst can reduce PM and so can contribute to the ability to meet the PM limits, but also that since an ASC has a similar function to a DOC, by placing it downstream of the SCR, it has a dual function. Firstly the ASC acts to remove excess ammonia, and secondly it also inherently acts to reduce PMs. Therefore by using and SCR with/without an ASC, when combined with the engine 14, which already has low particulate emissions, the engine system is able meet the limits under Tier 4 final/Stage IV off-highway engine systems.

A suitable engine and emission control system is provided with suitable Lambda, temperature, flow, pressure, $NO_x$ and ammonia sensors at suitable locations to ensure correct operation of the engine system at a variety of loads, temperatures, altitudes, and fuel qualities.

Although the invention has been described above with reference to one or more preferred embodiments, it will be appreciated that various changes or modifications may be made without departing from the scope of the invention as defined in the appended claims. Whilst the system has been schematically described, it will be appreciated that in reality, the exhaust ducting and aftertreatment units may take a number of differing forms. Certain units may be integrated in a single housing, the ducting may be shaped so as to package the system into a variety of space envelopes.

In one example, a four cylinder JCB Ecomax variant of the Dieselmax engine line having a power output of 93 kW and swept volume of 4399 cm$^3$ was fitted with the SCR and ASC arrangement outlined above and tested in the nonroad transient cycle (NRTC). The same engine was also tested without the arrangement. In both instances the engine utilised EGR and was fitted with a turbocharger.

The PM emissions at the exhaust pipe were found to be as follows:

| | PM (g/kWhr) | | |
|---|---|---|---|
| | Cold NRTC | Hot NRTC | Combined NRTC |
| No SCR/ASC | 0.0293 | 0.0154 | 0.0168 |
| With SCR/ASC | 0.135 | 0.0101 | 0.0106 |

As such the PM reduction in percentage terms was as follows:

| PM Conversion (%) | | |
|---|---|---|
| Cold NRTC | Hot NRTC | Combined NRTC |
| 53.89 | 34.69 | 37.30 |

It will be appreciated that for this particular model of engine, the PM emissions were within the combined limit of 0.02 g/kWh, but that the with SCR and ASC arrangement, a significant PM reduction was achieved that resulted in the Cold NRTC PM emissions being below the limit, and the combined emissions being almost 50% below the limit. However, other similar engines may not be within the limit, and may therefore require the PM removal provided by the system of the present invention.

The NOx emissions were also monitored during the same tests on this engine fitted upstream and downstream of the SCR and ASC, and the results were as follows:

| | NOx (g/kWhr) | | |
|---|---|---|---|
| | Cold NRTC | Hot NRTC | Combined NRTC |
| Pre SCR | 3.651 | 3.2601 | 3.2990 |
| Post SCR | 0.9283 | 0.0406 | 0.1294 |

Thus, without the SCR and ASC this engine is significantly outside the limit for NOx emissions, but the combined NRTC emissions are comfortably within the 0.4 g/kWhr limit.

Figure 2:
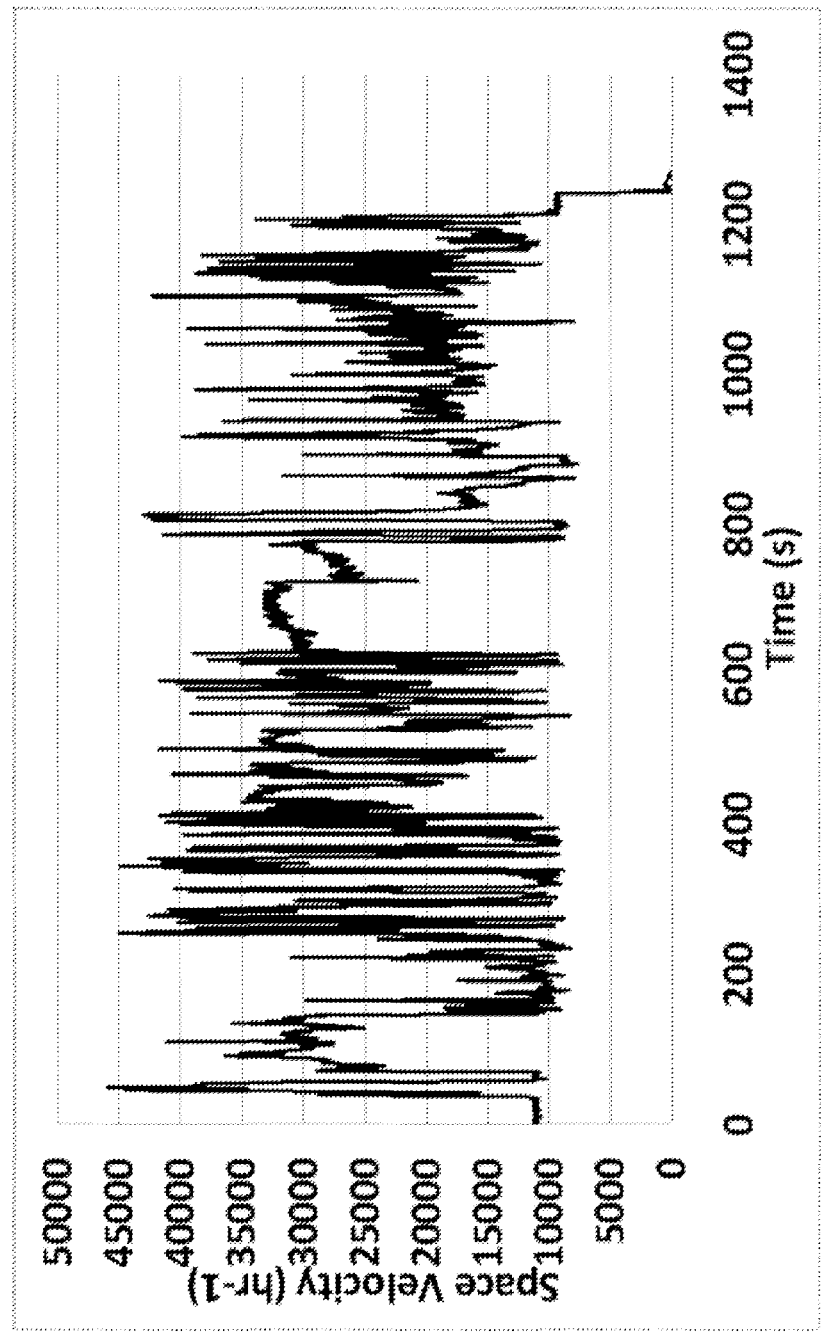
FIGS. 2 and 3 are graphs illustrating space velocity in the SCR during cold and hot NRTC test cycles respectively.
Figure 3:
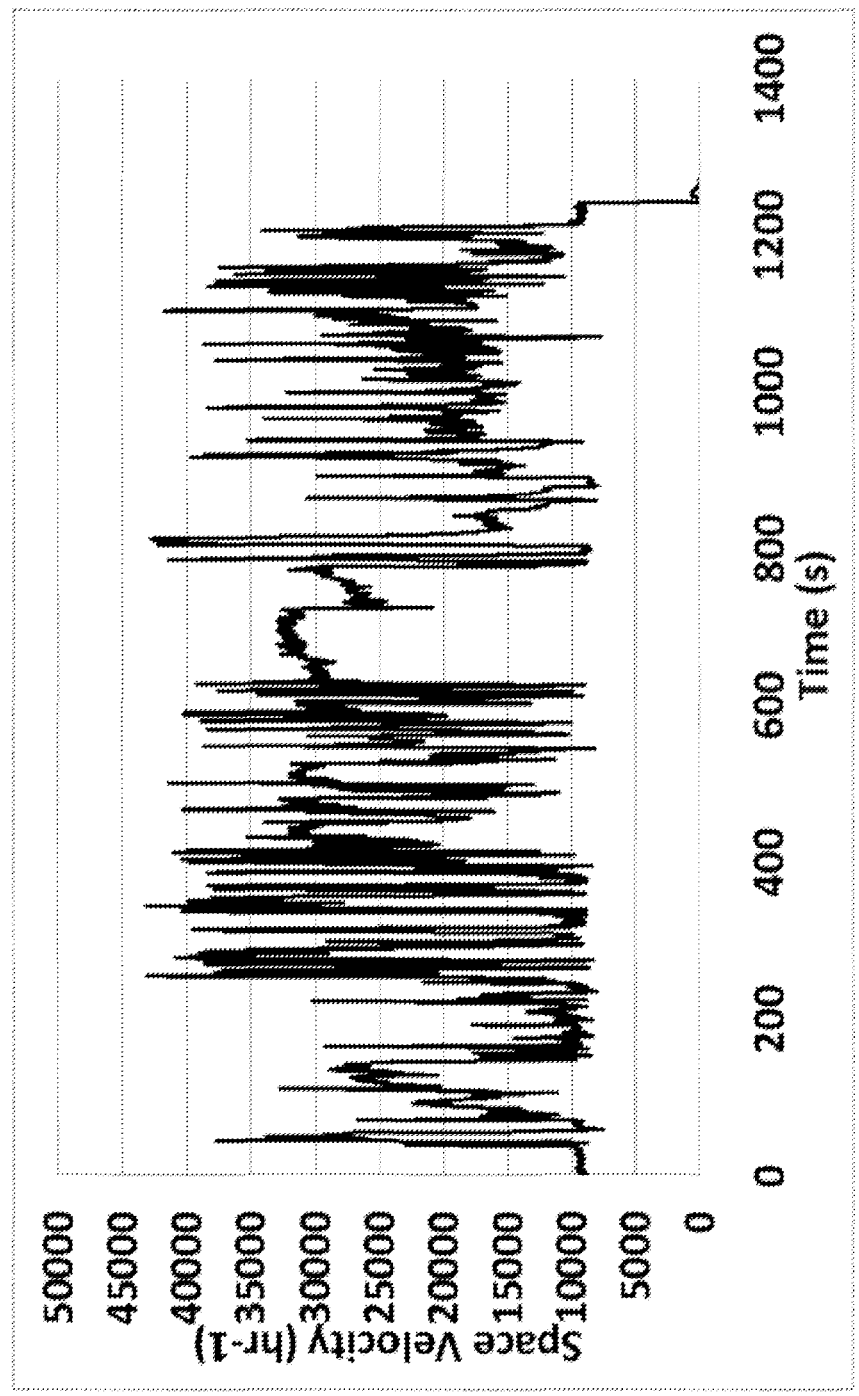

FIGS. 2 and 3 illustrate the space velocity within the SCR during the cold NRTC and hot NRTC test respectively, from which it can be seem that the range is from around 8,000 hr$^{-1}$ at the lower end of the range when the engines is at or close to idle rpm, and up to around 46,000 hr$^{-1}$ at the upper end of the range, when the engine is running at or near maximum rpm.

Figure 4:
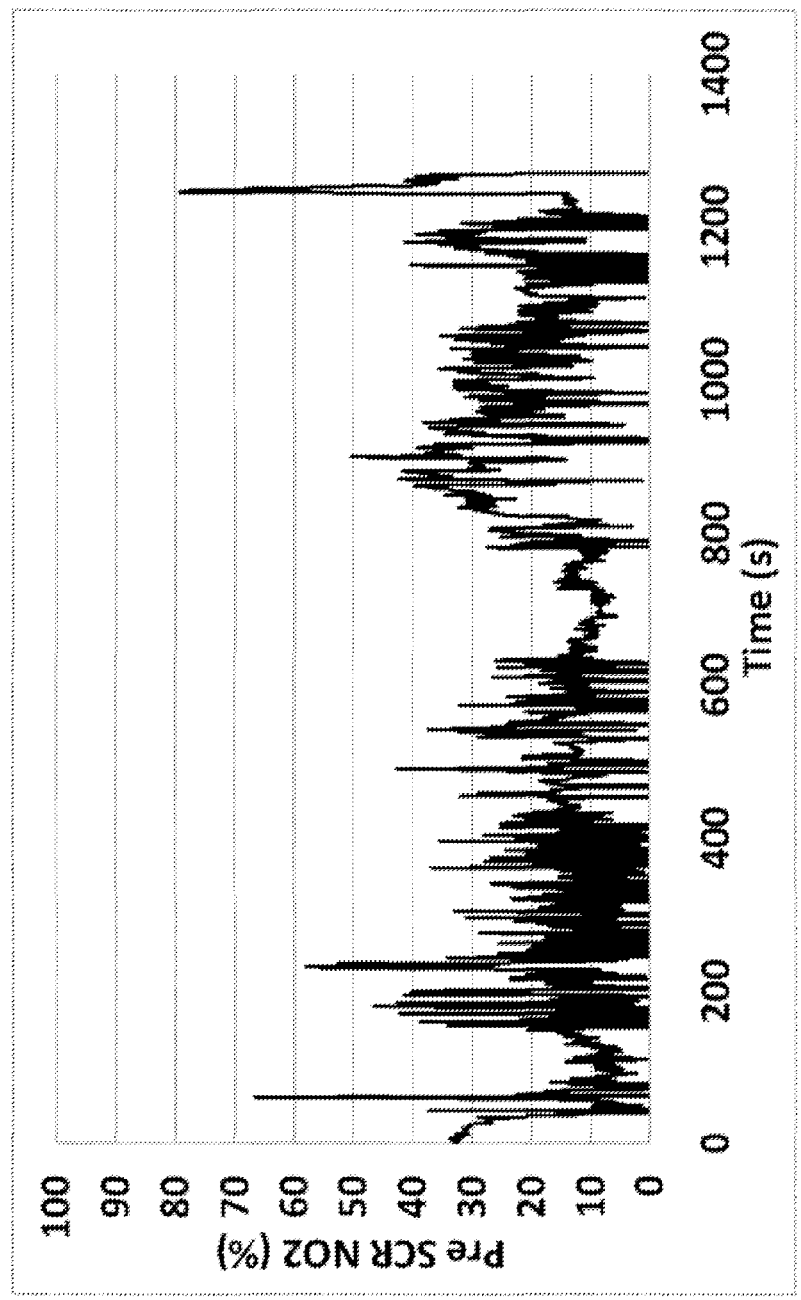
FIGS. 4 and 5 are graphs illustrating the percentage of $NO_2$ in the total amount of NOx at the entry to the SCR during cold and hot NRTC test cycles respectively.
Figure 5:
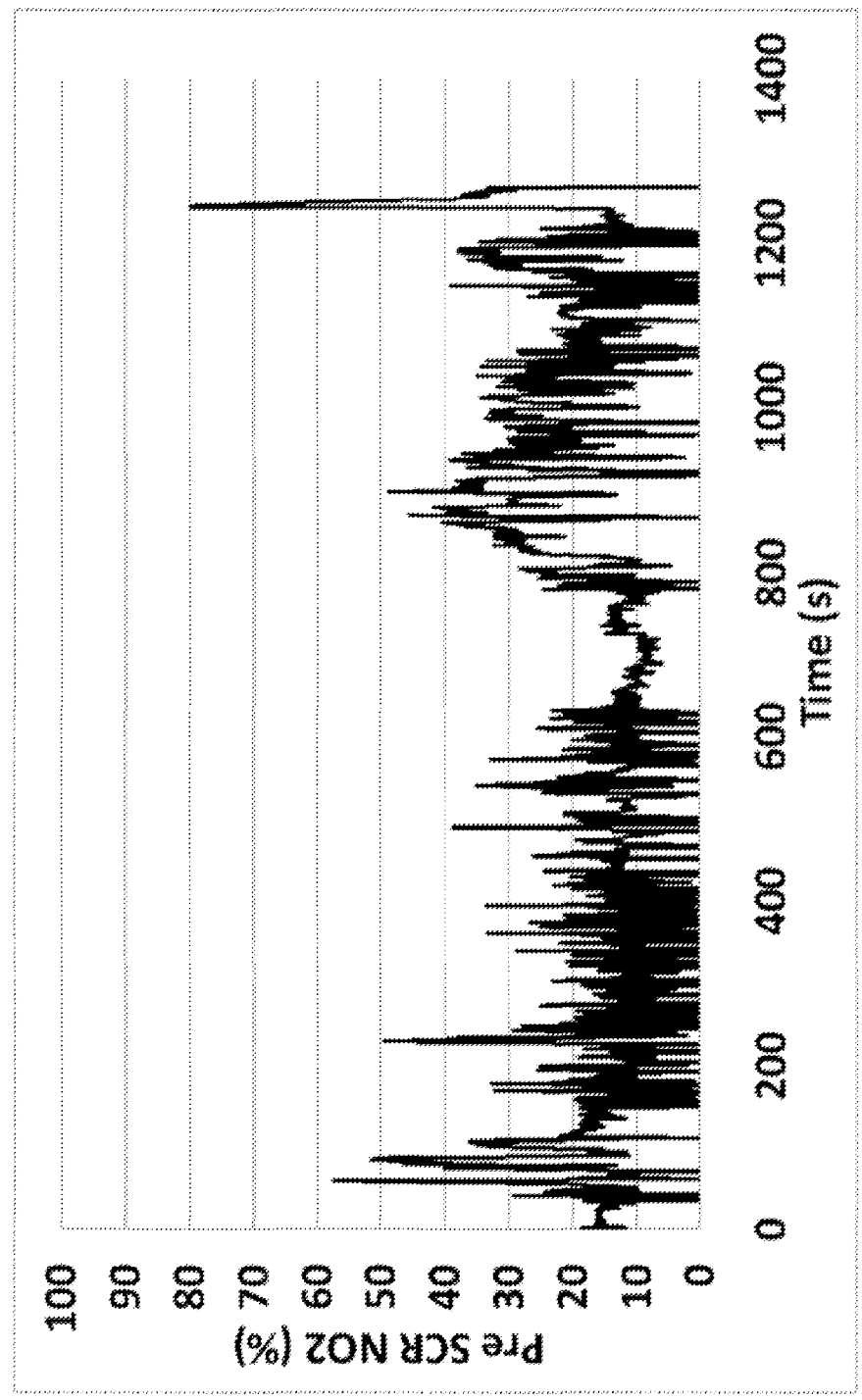

FIGS. 4 and 5 illustrate the proportion of NOx that is $NO_2$ upstream of the SCR in the cold and hot NRTC tests respectively. This illustrates that save for very short periods, $NO_2$ is generally significantly less than 50%, and therefore NO will be significantly more than 50%. As such it can be seen that the engine system of the present invention is able to meet the Tier 4 final/Stage IV emissions standards despite an $NO:NO_2$ ratio that is typically regarded as difficult for SCRs to handle.

The invention claimed is:

1. An engine system comprising:
    an off-highway engine system comprising a diesel engine having emissions of a particle material (PM);
    a reductant introduction point downstream of the diesel engine and in fluid flow communication therewith with no intervening treatment systems;
    a conduit immediately downstream of the reductant introduction point, the conduit configured to enable mixing of an injected reductant with exhaust gases of the engine to enable thermal decomposition to ammonia prior to entering an SCR catalyst,
    the SCR catalyst disposed immediately downstream of the conduit, wherein the SCR catalyst is a copper zeolite catalyst having activity at temperatures less than 300° C. such that a diesel oxidation catalyst (DOC) is not required;
    an ammonia slip catalyst (ASC) immediately downstream of the SCR catalyst and acting to remove excess ammonia;
    wherein the engine system does not include a diesel oxidation catalyst (DOC) or a diesel particulate filter (DPF) upstream of the SCR catalyst; and
    wherein the ASC and the SCR catalyst are configured to act in combination to reduce PM to 0.025 g/kWh or less; and
    further wherein the conduit, the reductant introduction point, the SCR catalyst and the ASC are arranged to act in combination to reduce NOx to 0.4 g/kWh or less.

2. The engine system according to claim 1, wherein the ASC removes a majority of the PM that are overall removed by the SCR catalyst and the ASC.

3. The engine system according to claim 2, wherein the ASC is arranged to remove up to 99% of the PM that are overall removed by the SCR catalyst and ASC.

4. The engine system according to claim 1 wherein the engine includes an exhaust gas recirculation (EGR) system.

5. The engine system according to claim 1 wherein the ASC is housed in the same housing as the SCR catalyst.

6. The engine system according to claim 1 wherein the reductant is urea.

7. The engine system according to claim 6 wherein the reductant is introduced as urea, and decomposes in the conduit to form ammonia.

8. The engine system according to claim 1, wherein the proportion of $NO_2:NO$ at the entry to the SCR catalyst is less than 50:50.

9. The engine system according to claim 1 wherein the engine has a capacity of greater than 2.5 liters.

10. The engine system according to claim 1 wherein the SCR catalyst has a velocity of 20000-80000 hr$^{-1}$ at rated power.

11. The engine system according to claim 1 wherein the engine system has a power output in the range of 55 kW to 130 kW.

12. The engine system according to claim 1 wherein the ratio of SCR catalyst volume to engine swept volume is in a range of 1.5 and 3.

13. A method of reducing diesel engine system emissions comprising the steps of:
   providing an off-highway engine system comprising a diesel engine having particulate emissions such that a particle material (PM) reduction of 50% or less is required to reduce emissions below 0.02 g/kWh;
   introducing a reductant at a reductant introduction point downstream of the diesel engine and in fluid flow communication therewith with no intervening treatment systems;
   providing a conduit immediately downstream of the reductant introduction point;
   mixing the reductant with exhaust gases of the engine,
   treating the mixture of reductant and exhaust gases in an SCR catalyst disposed immediately downstream of the conduit, wherein the SCR catalyst is a copper zeolite catalyst;
   treating the exhaust gases in an ammonia slip catalyst (ASC) downstream of the SCR catalyst to remove excess ammonia;
   wherein the engine system does not include a diesel oxidation catalyst (DOC) or a diesel particulate filter (DPF) upstream of the SCR catalyst; and
   wherein the reductant, the ASC and the SCR catalyst in combination act to reduce PM to 0.025 g/kWh or less and to reduce NOx to 0.4 g/kWh or less.

14. The method according to claim 13, including selecting the ASC such that the ASC removes a majority of the PM that are overall removed by the SCR catalyst and ASC.

15. The method according to claim 14, wherein the ASC removes up to 99% of the PM that are overall removed by the SCR and ASC.

16. An emissions abatement system comprising: an off-highway diesel engine;
   a reductant introduction point downstream of a connection to an exhaust outlet of the diesel engine and in fluid flow communication therewith with no intervening treatment systems;
   a conduit immediately downstream of the reductant introduction point having sufficient length to enable mixing of an introduced reductant with exhaust gases of the engine, the conduit downstream of the reductant introduction point extending uninterrupted and exiting into an SCR catalyst,
   the SCR catalyst disposed immediately downstream of the conduit with no intervening treatment components between an exit of the conduit and the SCR catalyst;
   an ammonia slip catalyst (ASC) disposed immediately downstream of the SCR catalyst and acting to remove excess ammonia;
   wherein the emissions abatement system does not include a diesel oxidation catalyst (DOC) or a diesel particulate filter (DPF) upstream of the SCR catalyst; and
   wherein the ASC and the SCR catalyst in combination act to reduce PM emissions by 20% or more.

* * * * *